Jan. 20, 1959    M. L. CLEVETT, JR    2,869,198
PISTOL BELT CLIP
Filed Aug. 17, 1955
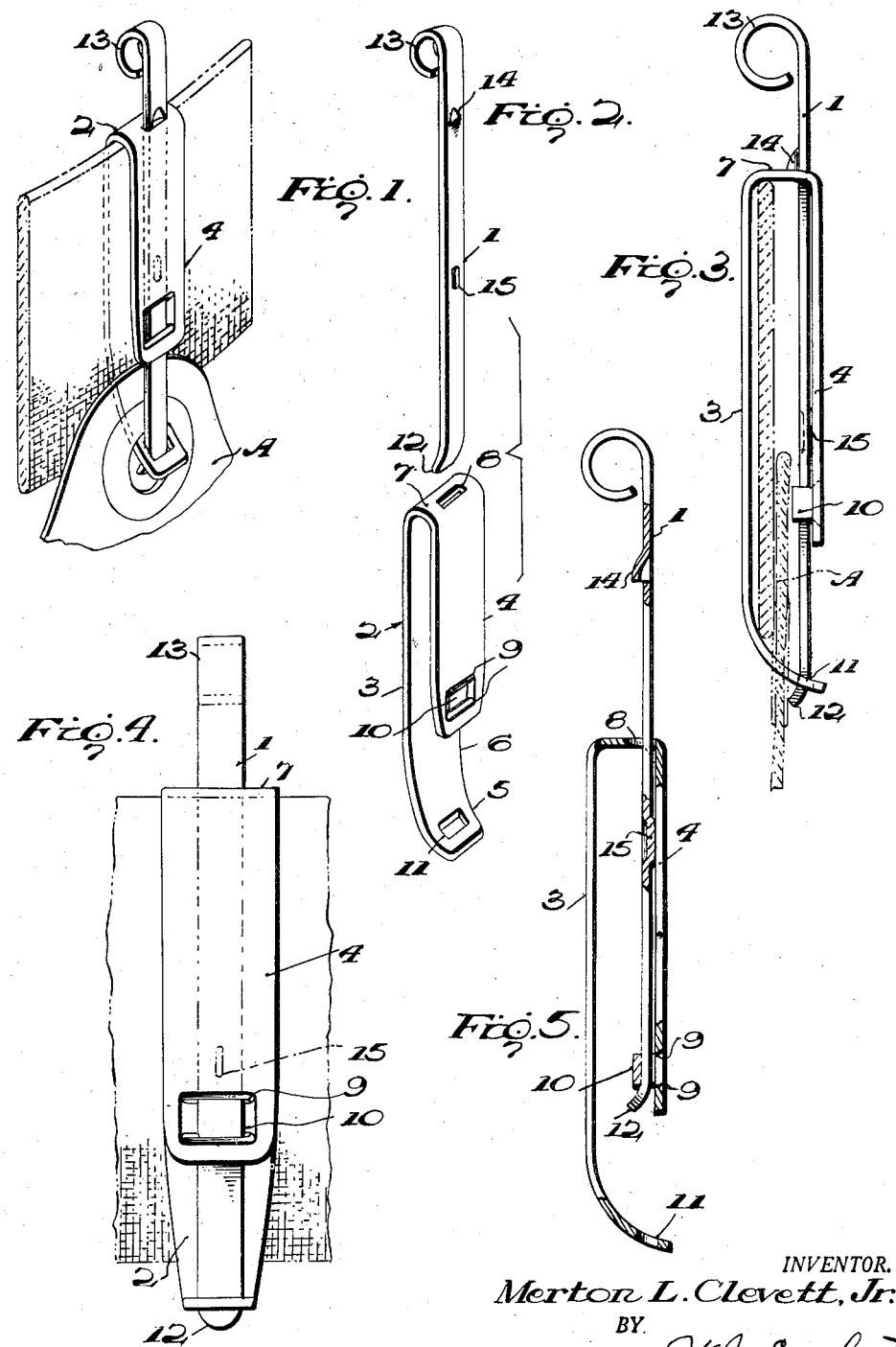
INVENTOR.
Merton L. Clevett, Jr.
BY
W. J. Eccleston
ATTORNEY.

United States Patent Office 2,869,198
Patented Jan. 20, 1959

2,869,198

PISTOL BELT CLIP

Merton L. Clevett, Jr., East Natick, Mass., assignor to the United States of America as represented by the Secretary of the Army Application August 17, 1955, Serial No. 529,087

3 Claims. (Cl. 24—3)

(Granted under Title 35, U. S. Code (1952), sec. 266)

The invention described herein, if patented, may be manufactured and used by or for the Government for governmental purposes, without the payment to me of any royalty thereon.

This invention relates to pistol belt clips for use by soldiers, whereby such items as canteens, intrenching tools, ammunition pouches, combat packs, and the like may be readily and quickly attached to or removed from the belt.

A primary object of the invention consists in providing a clip which is of light weight but strong and durable in operation; also one which is simple to operate, of low cost and readily reproducible in large quantities.

Another object of the invention resides in the provision of a bolt-action type of clip which can be easily operated by one hand and yet one in which the bolt is positively secured in operative position.

A further object of the invention consists in the provision of a clip which although easily operable is nevertheless so constructed as to prevent rattling of the parts either when the clip is loaded or empty.

Other objects and advantages of the invention will be apparent from the following description when taken in connection with the accompanying drawings, in which, Figure 1 is a perspective view of the improved belt clip and the belt and article with which it is associated;

Figure 2 is an exploded view of the two elements of the clip in separated condition;

Figure 3 is a side elevational view of the clip showing the belt in dotted outline;

Figure 4 is a front elevational view of the improved clip mounted on a belt, and, Figure 5 is a vertical sectional view through the clip per se with its slide bolt shown in retracted or open position.

The bolt just referred to is indicated by the numeral 1 and the numeral 2 indicates a substantially U-shaped member in which the slide bolt 1 is reciprocably mounted.

The U-shaped member 2 comprises an inner or rear leg 3 which is substantially longer than the front and shorter leg 4. The longer leg 3 has its lower end 5 bent forwardly into approximately the plane of the shorter leg 4, and due to the difference in length between the legs the gap 6 is provided between the free ends of the two legs. It is by reason of this gap 6 that an article such as indicated by the reference character A (Figure 2) may be applied to the clip and secured in position thereon through the medium of the sliding bolt 1 heretofore referred to.

The base 7 of the inverted U-shaped member 2 is provided with a transverse slot 8 adjacent its forward edge, and the lower end of the shorter leg 4 is formed with a pair of parallel slots 9 to provide a cut-out portion or bar 10 which is depressed inwardly beyond the inner face of the shorter leg 4 to serve as a guide for the free end of the bolt 1 as more clearly indicated in Figures 3 and 5. The free end of the longer leg 3 which, as mentioned above, is turned into approximately the plane of the shorter leg 4, is provided with a slot 11 which is in substantially the plane of movement of the bolt 1 and serves to receive the lower end of the bolt when the latter is moved to its closed or locking position. The free end of the bolt 1 is bent inwardly as indicated by the numeral 12 and serves in conjunction with the guide bar 10 to lock the bolt against inadvertent separation from the U-shaped member 2. This inturned end 12 of the bolt also releasably interlocks with a wall of the slot 11 when the bolt is in closed position and thus serves to releasably secure the bolt is in its locking position with respect to the U-shaped member 2.

The outer end of the bolt 1 is provided with a curled portion 13 to provide a hand grip by means of which the bolt may be manually operated. Spaced downwardly below the hand grip 13 the bolt 1 is provided with an inwardly directed lug 14 struck up from the material of the bolt and thus integrally formed therewith. This stop lug 14 is so positioned as to engage the base 7 of the U-shaped member at the time the inturned end 12 of the bolt passes through the slot 11 in the lower end of the longer leg 13 thereby serving to accurately position the bolt with respect to the U-shaped member 2 when the bolt is slid home to its securing position. Also struck up from the bolt 1 is a dimple or protuberance 15 which projects slightly beyond the outer surface of the bolt 1 so as to engage the inner face of the shorter leg 4 of the member 2. The purpose of this dimple 15 is to prevent undue rattling of the bolt with respect to the U-shaped member 2 rather than for the purpose of providing a frictional engagement between the elements 1 and 2 since the proper positioning of the parts is taken care of by means of the lug 14, inturned end 12 and the guide 10 with which the element 12 cooperates.

In the operation of the device the U-shaped member 2 may be passed transversely over the belt when the bolt is open or when the slide bolt 1 is in operative position to form a continuous loop it may be threaded over the end of the belt on which it is to be mounted and moved to a suitable position along the length of the belt. When it is desired to secure or support any one of the several items referred to above on the belt, the hand grip 13 of the bolt is grasped by the wearer and pulled upwardly so as to raise the bolt 1 to its upper limit in which the bent end 12 engages the guide loop 10. In this position the gap 6 between the free ends of the legs 3 and 4 is opened so that the handle or other attaching portion of the item to be secured to the belt may be passed therethrough; after which the bolt 1 is pressed downwardly until the stop lug 14 engages the base of the U-shaped member 2 and the inturned end 12 is snapped past a wall of the slot 11 in the lower end of the longer leg 3. In this position of the bolt 1 the gap 6 is closed so that the canteen or other item to be attached to the belt is securely locked in position until such time as the operator forcibly raises the bolt to disengage the inturned end 12 from the wall of the slot 11.

From the foregoing description taken in connection with the accompanying drawings it will be apparent to those skilled in the art that I have devised an exceedingly simple and inexpensive two-part pistol belt clip which may be formed of light yet strong and durable material, that it may be readily and cheaply produced in great quantities, that it is of the "bolt-action" type clip, that inadvertent separation of the parts is impossible, that the bolt is readily operated by one hand of the wearer and automatically secured in locking position and that any rattling of the parts is prevented.

In accordance with the patent statutes I have described herein the preferred form of the invention, but obviously minor structural details may be changed without avoiding the spirit of the invention, and it is intended that all such changes be included within the scope of the appended claims.

I claim:

1. A clip for pistol belts and the like comprising a substantially U-shaped member of resilient material, one leg of said member being longer than the other and having its free end bent to intercept the plane of the shorter leg, said U-shaped member having a pair of substantially aligned slots, one in the free end of the longer leg and the other in the bight of the U-shaped member, a bolt slidably mounted in the slots of the U-shaped member, said bolt having one end portion bent toward the longer leg for snapping over a wall of the slot therein to releasably hold the bolt against opening movement, and a stop lug on the bolt for limiting its inward movement.

2. A clip for pistol belts and the like comprising a substantially U-shaped member of resilient material, one leg of said member being longer than the other and having its free end bent to intercept the plane of the shorter leg, said U-shaped member having a pair of substantially aligned slots, one in the free end of the longer leg and the other in the bight of the U-shaped member, a bolt slidably mounted in the slots of the U-shaped member, said bolt having one end portion bent toward the longer leg for snapping over a wall of the slot therein to releasably hold the bolt against opening movement, a stop lug on the bolt for limiting its inward movement, and cooperating means between the U-shaped member and bolt for preventing rattling between the parts.

3. A clip for pistol belts and the like comprising a substantially U-shaped member of resilient material, one leg of said member being longer than the other and having its free end bent to intersect the plane of the shorter leg and providing a space between the ends of the two legs of the U-shaped member, said member having a pair of substantially aligned slots, one in the free end of the longer leg and the other in the bight of the U-shaped member, a bolt slidably mounted in the slots of the U-shaped member and adapted to close the space between the ends of the legs of the U-shaped member, said bolt having one end portion bent toward the longer leg for snapping over a wall of the slot therein to releasably hold the bolt against opening movement, and a stop lug on the bolt for limiting its inward movement.

References Cited in the file of this patent

UNITED STATES PATENTS

| | | |
|---|---|---|
| 734,504 | Bew | July 28, 1903 |
| 816,750 | Smith | Apr. 3, 1906 |
| 1,484,508 | Lasserre | Feb. 19, 1924 |
| 2,823,434 | Van Buren | Feb. 18, 1958 |

UNITED STATES PATENT OFFICE
CERTIFICATE OF CORRECTION

Patent No. 2,869,198                                January 20, 1959

Merton L. Clevett, Jr.

It is hereby certified that error appears in the printed specification of the above numbered patent requiring correction and that the said Letters Patent should read as corrected below.

Column 3, line 11, for "intercept" read -- intersect --; column 4, list of references cited, under UNITED STATES PATENTS, insert the following references:

489,596 Adams --------- Jan. 10, 1893
         824,179 Hayes --------- June 6, 1906
      1,025,520 Douglass ------- May 7, 1912
      1,527,809 MacDonald ----- Feb. 24, 1925
      1,709,234 Shaffer -------- Apr. 16, 1929
      1,798,403 Didich --------- Mar. 3, 1931
      2,556,117 Smith ---------- June 5, 1951

Signed and sealed this 5th day of May 1959.

(SEAL)
Attest:
KARL H. AXLINE

Attesting Officer

ROBERT C. WATSON
Commissioner of Patents